March 3, 1942. G. A. LYON Re. 22,042

ORNAMENTAL RING FOR DISK WHEELS

Original Filed Sept. 20, 1934 4 Sheets-Sheet 1

INVENTOR
George Albert Lyon.
Charles Allen Atty.

by

March 3, 1942. G. A. LYON Re. 22,042
ORNAMENTAL RING FOR DISK WHEELS
Original Filed Sept. 20, 1934 4 Sheets-Sheet 2
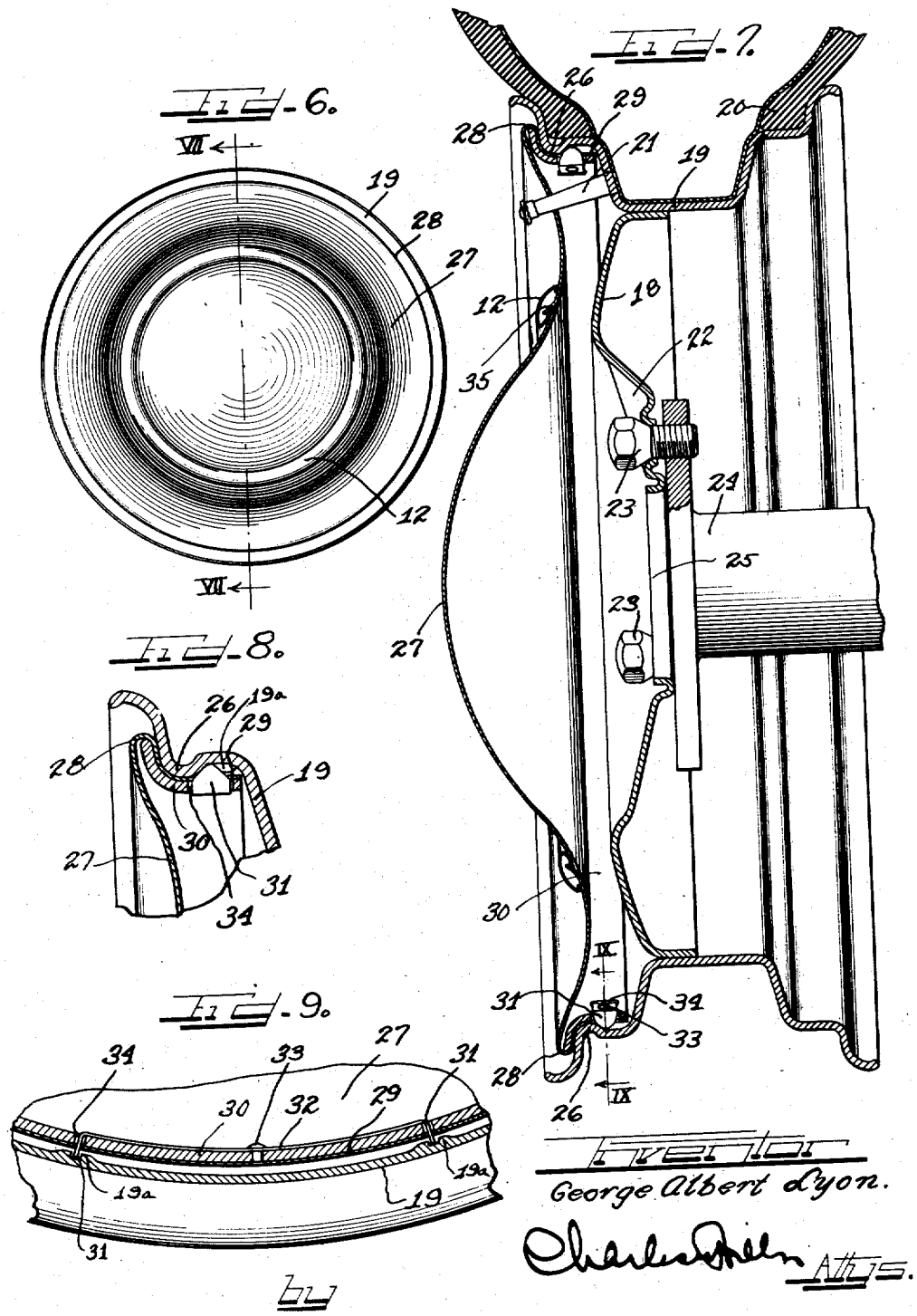
INVENTOR
George Albert Lyon.
Charles Allen Atty.

March 3, 1942. G. A. LYON Re. 22,042

ORNAMENTAL RING FOR DISK WHEELS

Original Filed Sept. 20. 1934 4 Sheets-Sheet 3

Inventor
George Albert Lyon.
Charles Allen
Atty.

by

March 3, 1942. G. A. LYON Re. 22,042

ORNAMENTAL RING FOR DISK WHEELS

Original Filed Sept. 20, 1934 4 Sheets-Sheet 4

Inventor
George Albert Lyon.
by Charles Sellers Atty.

Reissued Mar. 3, 1942

Re. 22,042

UNITED STATES PATENT OFFICE 22,042

ORNAMENTAL RING FOR DISK WHEELS

George Albert Lyon, Allenhurst, N. J.

Original No. 2,102,470, dated December 14, 1937, Serial No. 744,758, September 20, 1934. Application for reissue October 6, 1939, Serial No. 298,224

14 Claims. (Cl. 301—37)

This invention relates to improvements in ornamental rings for disk wheels, and more particularly to ornamental rings or bands for application to the external surface of disk wheels for vehicles, not only for decorative purposes, but also having the utility of covering and protecting interstices, cracks or gaps between the relative parts of the wheel, although the invention may have many other applications and purposes as will be apparent to one skilled in the art.

The disk wheel art is taking a definite trend towards the use of an outer, more or less decorative shell made to simulate spokes or not, but in most instances, designed to cover an inner supporting plate, which inner plate actually carries the major portion of the load on the wheel. In some instances, the outer shell is centrally apertured to embrace the spindle of the wheel and accommodate a hub cap, while in other instances this outer shell is designed to cover the entire external surface inside the outer rim flange and totally conceal the spindle without the aid of any hub cap construction. The outer shell is also either permanently or removably attached to the wheel rim. If permanently attached, there is a crack or gap at the point of jointure into which dust and dirt or mud is inclined to gather and render the wheel unsightly in appearance, as well as cause deterioration of the parts of the wheel thereadjacent. When the outer shell is removably attached to the rim, the crack or gap might not be quite so apparent nor quite so susceptible to the accumulation of mud and dirt therein, but there will be an apparent point of jointure which can be improved in appearance by the application of the present invention, and the invention might also be applied to a desirable part of the external surface of such a shell to generally improve the appearance of the composite whole.

Accordingly, it is an object of this invention to provide an ornamental ring or band for attachment to the external surface of a vehicle wheel so as to overlie the point of jointure between the wheel shell and the wheel rim.

It is also an object of this invention to provide a ring or band for attachment to the outer surface of a member, both the ring and member each having means associated therewith engageable with the means of the other element for holding the parts together, the initial and original shape of the ring or band being variable during application to insure and enhance such engagement.

As evidence of the foregoing objects of the invention, the present invention is not strictly limited to application to a wheel disk, but the decorative band might be attached to various elements of various shapes as will be apparent to one skilled in the art, and it is also an object of this invention to provide such a decorative ring or band having an underturned concealed engaging portion, said portion being engageable with suitable means associated with the element to which the ring is attached, the ring or band being variable as to its initial shape to insure such engagement.

Still another object of this invention is the provision of a decorative band attachable to the outer surface of another element, the band having underturned means for engagement with spaced means associated with the surface of the element, the band being first placed in position with a slight engagement between the parts, and then the band is pressed into position, distorting the initial shape of the band and insuring tight engagement.

Also an object of this invention is the provision of a decorative ring or band having an underturned flange disposed at an angle to the outer portion of the band, by means of which flange the band may be placed against an outer surface of an element having teeth projecting from the surface, with the underturned portions in light engagement beneath the projecting teeth, and then the band may be forced inwardly to vary the angle between the outer portion and the underturned flange and enhance the engagement with the teeth.

It is to be understood that the present invention can be made either in the form of an endless, continuous band or ring, or in the form of a split ring, and it is an object of the invention to provide a decorative band of the character hereinafter described either in the form of a continuous band or a split ring.

Another object of the invention is the provision of a decorative band for attachment to a wheel disk, the band being in the form of a split ring and having an underturned portion engageable with spaced means associated with the wheel disk, the spaced means on the wheel disk being out of alignment with the circumference of a true circle so that the band when distorted for engagement thereupon will be in the form of a true circle.

It is a further object of the invention to provide a decorative band in the form of a split ring having overlapped ends for attachment to a wheel disk and with spaced means thereon for engagement with a portion of the band, the overlapped ends being so formed that when the band is distorted slightly out of alignment with the true circle, the formed ends will conceal the fact and give the band the appearance of a true circle.

Another object of the invention is the provision of a decorative band for attachment to a wheel disk, having spaced underturned teeth engageable through spaced apertures in the wheel disk to hold the band in position thereupon.

It is also an object of this invention to provide a decorative band in the form of a resilient split ring having means engageable with means on the surface to which the band is to be attached, the inherent resiliency of the band maintaining it in place upon the surface.

Still another object of the invention is the provision of new and novel means for attaching a wheel disk to a wheel rim, the disk being provided with a decorative band or not, as deemed most desirable.

While some of the more salient features, characteristics and advantages of the present invention have been above pointed out, others will become apparent from the following disclosures.

The invention includes these and other features of construction and combinations of parts hereinafter described and shown in a preferred form in the drawings, as more particularly indicated by the claims.

On the drawings:

Figure 6 is a side elevational view of a combination structure including the disk-wheel and ornamental band, embodying the principles of the present invention.

Figure 7 is an enlarged fragmentary vertical sectional view through the structure of Figure 6 taken substantially as indicated by the line VII—VII of Figure 6.

Figure 8 is a greater enlarged view of a part of the structure of Figure 7.

Figure 9 is an enlarged fragmentary sectional view taken substantially as indicated by the line IX—IX of Figure 7.

As shown on the drawings:

Figure 1:
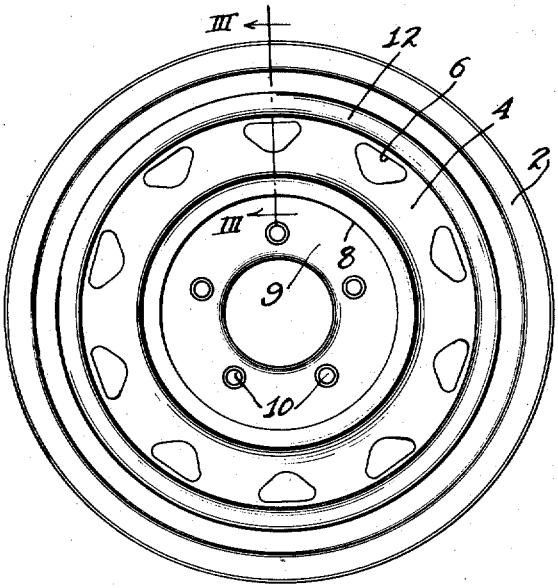
Figure 1 is a side elevational view of a disk-wheel for a vehicle, showing the same equipped with a decorative ring or band embodying principles of the present invention.

In one illustrated embodiment of this invention, and with reference to Figures 1 to 5, inclusive, there is shown a vehicle wheel made up on an inner supporting plate 1 (Figures 3 and 4) having an inwardly turned circumferential flange to which a tire rim 2 is secured by means of spaced rivets 3. An outer plate or decorative shell 4 also having a circumferential flange 5 is also held in position by means of the rivets 3, the flange 5 being disposed between the inner plate 1 and the tire rim 2. With this arrangement, the inner plate 1 carries the major portion of the load upon the wheel, while the outer shell 4 aids in stiffening the construction, as well as rendering the completed wheel pleasing in appearance.

The outer shell 4 may, if so desired, be provided with suitable apertures 6 so that the shell simulates a spoked wheel, and the inner shell 1 is provided with suitable apertures behind the apertures 6, the shell 4 being formed with the metal projecting through the apertures in the inner shell and then being folded therearound, as indicated at 7 (Figures 3 and 4) to rigidly and securely unite the relative parts. The outer shell 4 has an open central portion 8, normally closed by a hub cap (not shown on the drawings), in the usual manner, and adjacent this aperture the inner plate 1 is formed into a flange-like portion 9 provided with suitable bolt holes 10 for securing the wheel to a spare wheel supporting bracket, as seen in Figure 7, or to the supporting member on the axle of a vehicle as is well understood in this art.

Figure 4:
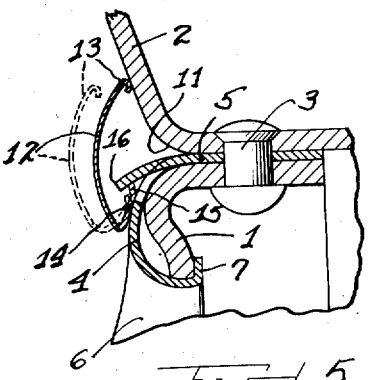
Figure 4 is a greater enlarged view similar to Figure 3, illustrating the application of the band shown in Figure 1.
Figure 3:
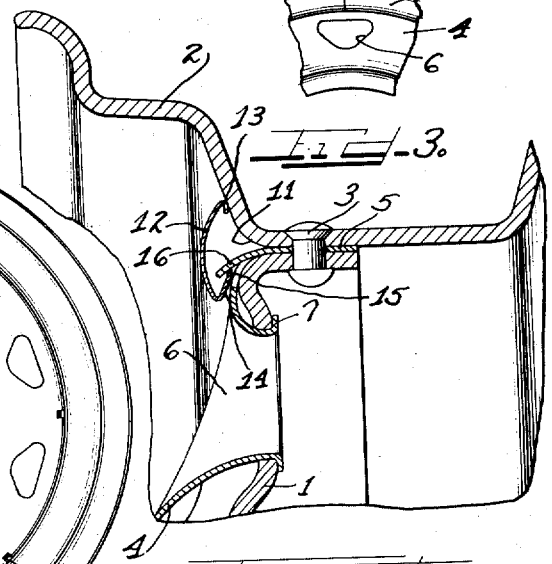
Figure 3 is an enlarged fragmentary sectional view of the structure shown in Figure 1 taken substantially as indicated by the line III—III of Figure 1.
Figure 10:
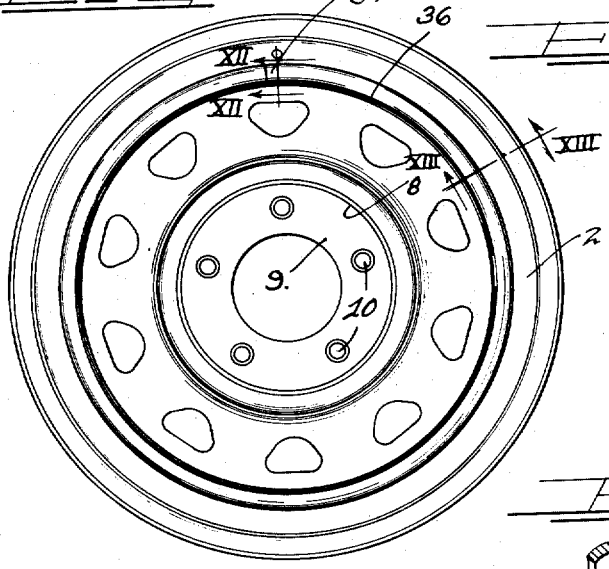
Figure 10 is a side elevational view of a combination of disk-wheel and decorative band, similar to Figures 1 and 6, but showing a different type of band.
Figure 12:
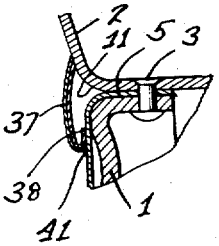
Figure 12 is an enlarged fragmentary vertical sectional view taken substantially as indicated by the line XII—XII of Figure 10.
Figure 13:
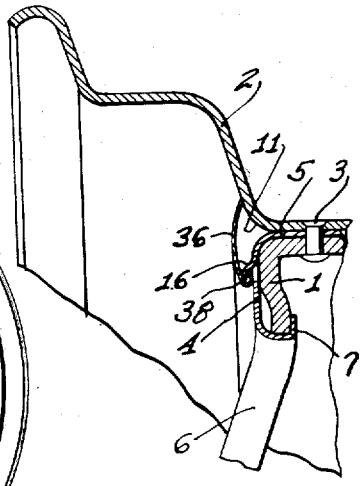
Figure 13 is an enlarged fragmentary vertical sectional view taken substantially as indicated by the line XIII—XIII of Figure 10.

As seen more clearly in Figures 3 and 4, there will be a gap or crack 11 between the shell 4 and the tire rim 2, and this gap, if left unprotected, would tend to fill with mud and dirt, thus rendering the wheel unsightly in appearance as well as causing some decomposition of the metal adjacent the gap. Therefore, the present invention provides an ornamental ring or band 12 for covering this gap 11. As seen in Figures 1 to 4, inclusive, this ornamental band is in the form of a continuous endless ring and comprises an outer, preferably transversely arcuate portion on which the upper edge is rolled inwardly, as indicated at 13, to prevent marring of the adjacent structure. Opposite the turned edge 13, the band is provided with an underturned flange or portion 14 having a backwardly bent edge 15 to prevent marring of the surface of the shell 4. This underturned portion is normally concealed by the outer portion of the band 12 to enhance the appearance of the resultant wheel structure.

The band 12 is held in position upon the wheel in this instance by means of spaced lugs 16 struck outwardly from the shell 4 adjacent the gap or crack 11. These lugs are preferably located along the circumference of an imaginary circle of such diameter that the outwardly projecting ends of the lugs are located in an imaginary circle of slightly greater diameter than the bent marginal portion 15 of the band prior to the application of the band.

As indicated by the dotted lines in Figure 4, the angle between the outer portion of the band and the underturned portion 14 is greater prior to the application of the band to the wheel than afterwards. In completing the composite structure, the band in the form shown by the dotted lines is placed against the side surface of the wheel, and the resiliency of the band permits the bent marginal portion 15 on the underturned part 14 to pass behind the projecting ends of the lugs 16. By any suitable mechanism, the band is then pressed against the wheel, thereby distorting the band from its initial shape by making the angle between the outer portion of the band and the underturned portion 13 more acute. When the band is so bent, the underturned portion 14 will be forced outwardly beneath the lugs 16, thereby insuring positive engagement. The upper turned edge 13 of the band will rest against the rim 2, the lower portion of the band resting against the shell 4, and the gap or crack 11 is completely covered and protected in a highly decorative manner.

Figure 5:
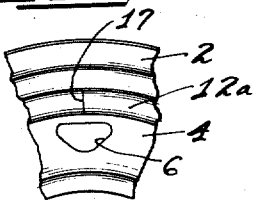
Figure 5 is an enlarged fragmentary side elevational view of the structure shown in Figure 1, illustrating a slightly different form of the band.
Figure 2:
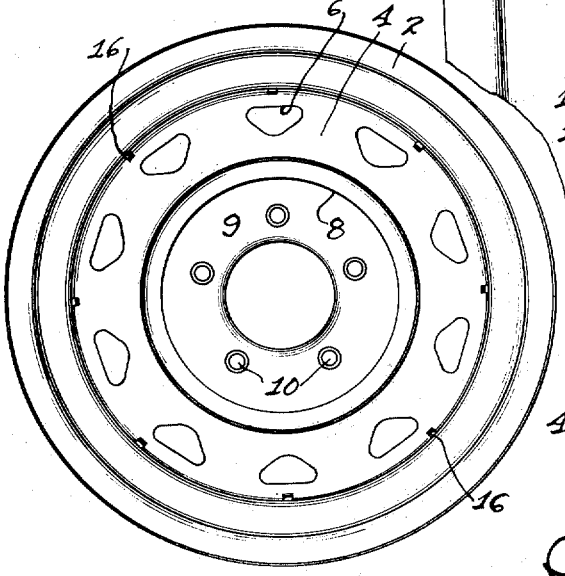
Figure 2 is a view similar to Figure 1 showing the disk-wheel prior to the application of the band of the present invention.

As indicated in Figure 5, a split ring form of band 12a may be utilized if so desired. This band is identical in construction with the band 12 except that it is split transversely with the ends abutting, as indicated at 17, when the band is applied to the wheel. These ends may be held in abutting relationship by means of the inherent resiliency of the band 12a or, if so desired, the ends may be butt welded in a well-known manner.

Figure 15:
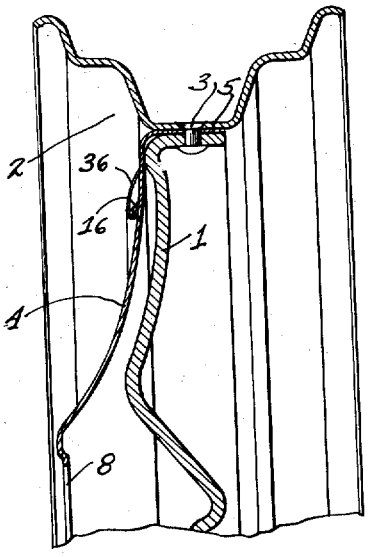
Figure 15 is an enlarged vertical sectional view similar to Figure 13, but showing the band attached in a different location.

Of course, is so desired, the lugs 16 may be struck from the outer shell at any desirable point and the band 12 or 12a placed upon the shell at the same point, it not being necessary to overlie the gap 11 with the band. As more fully explained later herein and as illustrated in Figures 7 and 15 of the drawings, decorative bands may be placed in other regions for decorative purposes.

In Figures 6 to 9, inclusive, I have illustrated a new form of wheel construction embodying principles of the present invention. In this instance, an inner main supporting plate 18, provided with a circumferential flange, is secured in any desired manner to a tire rim 19 adapted to support a tube and tire unit 20 in the usual manner, with the valve stem 21 projecting through a suitable aperture in the rim. The central portion of the plate 18 is provided with a plurality of indentations 22 at the base of each of which a suitable aperture is provided for the accommodation of a bolt 23, by means of which the entire wheel structure may be attached to a spare wheel supporting bracket 24, as illustrated, or to the usual wheel supporting element upon the axle of a vehicle. A central aperture 25 in the plate 18 provides an opening for the end of the wheel spindle.

Adjacent the outer portion thereof, the tire rim 19 is provided with shoulder means 26 formed integrally in the rim, for a purpose that will be later apparent herein.

In this instance, a great portion of the tire rim and everything within the circle defined thereby is covered by means of a covering shell 27, preferably bellied outwardly in the central region to properly overlie the end of the spindle and enhance the appearance of the construction. This shell 27 is preferably made of a single piece of metal and has the outer marginal portion thereof reversely folded to provide a circumferential flange 28 which lies against the portion of the rim 19 when the shell is in position upon the wheel. A circumferential flange 29 extends inwardly from the reversely bent marginal portion and this flanged part 29 is supported and stiffened by a circumferential reenforcing element 30.

The shell 27 is removably held in position by means of a substantially triangular-shaped head 31 upon a leaf spring 32, secured in any suitable manner, such as by rivets 33, to the inner surface of the supporting member 30. As indicated at 34, the supporting element 30 and the flange 29 are apertured to accommodate the head 31 and the spring 32, the head 31 projecting through the aperture and beyond the flanged portion 29 for engagement with the undersurface of the tire rim 19. The rim 19 is preferably provided with spaced pairs of lugs 19a just within the shoulder means 26, each head 31 on a spring 32 seating between the lugs of a pair to prevent relative rotation between the shell 27 and the rim.

As seen more clearly in Figures 7 and 8, the entire shell 27 may be mounted upon the rim by merely pressing the shell into place, the pressing action causing the heads 31 upon the springs 32 to be moved inwardly until they have cleared the annular bead 26 on the rim, whereupon they will snap outwardly, engaging behind the bead, and hold the shell in position. To remove the shell, it is a simple expedient to insert a screw driver or some similar instrument behind the bead 28 of the shell and pry against the rim 19 to force the shell off the rim, the sloping walls of the heads 31 permitting in and out movement of the shell.

As seen best in Figures 6 and 7, lugs 35 may be struck at spaced points from the material of the shell so as to extend outwardly and a decorative band 12 mounted in position in engagement with these lugs in the manner previously described in connection with Figures 1 to 4, inclusive. Of course, the band 12a mentioned in connection with Figure 5 hereinabove might equally as well be applied to the surface of the shell 27.

In Figures 10 to 14, inclusive, I have shown a composite wheel structure utilizing a different form of decorative ring or band. In this instance, the wheel construction, of the character shown in Figures 1 to 4, inclusive, as illustrated, includes the inner supporting plate 1, the outer shell 4 with the inwardly turned circumferential flange 5, both secured to a wheel rim 2 by means of spaced rivets 3, the shell 4 being constructed to simulate spokes and secured to the plate 1 by a bent over portion 7, all in the manner previously described. The shell 4 has a central aperture 8 therein leaving exposed a flange-like portion 9 in the plate 1 provided with bolt holes for mounting the wheel upon a wheel axle member or upon a bracket for spare wheels, as the case may be. The shell 4 is also provided with a plurality of outwardly struck lugs 16 adjacent the crack or gap 11 between the shell and the rim 2.

However, in this instance, a decorative band 36 in the form of a split ring with overlapped ends, indicated at 37, is mounted in position over the lugs 16. This band 36 is preferably self-expansible and due to its inherent resiliency, tends to expand outwardly with sufficient force to hold the band in position upon the wheel.

The band 36 is provided with an underturned portion 38, normally concealed by the outer, preferably transversely arcuate portion of the band, and engageable beneath the lugs 16. In applying the band to the wheel, the band is forcibly contracted by overlapping the ends thereof and placed in position so that the underturned portion 38 is engaged beneath the lugs 16, whereupon the band is permitted to expand up to the limit defined by the lugs and the resiliency of the band retains intimate position.

Of course, if the lugs are disposed along the circumference of an imaginary circle, the band upon being applied to the lugs will not be exactly regular, and, if the ends of the band were of the same size and configuration as the body portion of the band, one end would project above the other. However, if the ends of the band are cut so that the outer surfaces thereof are seemingly flush with each other, the variance of the band from a true circle is sufficiently small as not to be noticeable with the naked eye of the ordinary observer.

Figure 14:
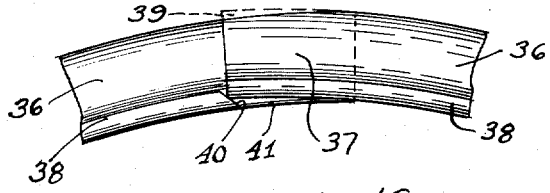
Figure 14 is a somewhat diagrammatic view, comprising an enlarged fragmentary elevational view of the rear portion of the band shown in Figure 10 adjacent the overlapped ends of the band.

To accomplish this purpose, one end of the band 36 has the upper portion thereof shaved to remove the dotted line portion 39, as seen in Figure 14. The removed portion 39 is that portion which would normally project above the other end of the band if the ends of the band were of the same size and contour as the body portion thereof.

The opposite end of the band 36 has the lower portion thereof cut away along a side 40 (Figure 14) and from this point the underturned portion 38 is substantially removed to the end of the band. However, a slightly turned portion 41 of the underturned portion 38 is left upon the band so that there will be an engagement between this portion and the underturned portion 38 of the opposite end of the band. Of course, the opposite end of the band will not fit flush within the turned portion 41 but will project thereabove, but, in view of the shaving of the upper portion 39, both ends of the band will give an external appearance of a continuous circular band with the exception of the one exposed line at the termination of the outer end.

Figure 11:
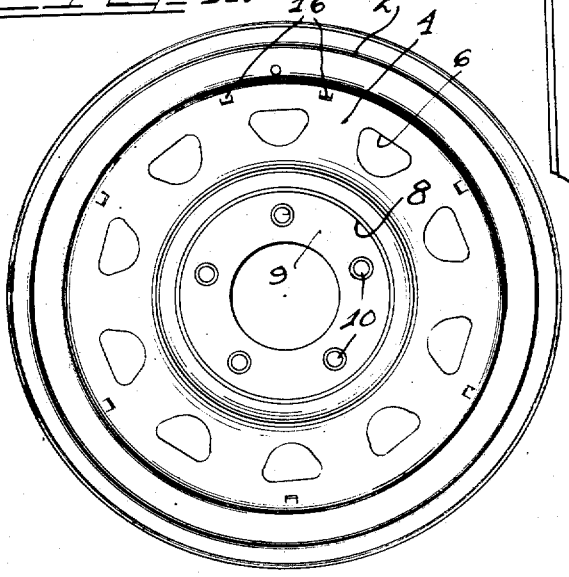
Figure 11 is a view similar to Figure 10 prior to the attachment of the band.

With reference to Figure 11, it will be noted that the lugs 16 are preferably not evenly spaced, but that two lugs are provided adjacent the overlapping ends 37 of the band in relatively close relationship. These lugs will then just support the band close to the overlapping ends and on each side of the overlap.

If so desired, the lugs 16 may be struck from the shell 4 at sufficient variance from the circumference of a circle so that when the band 36 is applied to the lugs it will very closely follow a true circle. Such a disposition of the lugs cannot be feasibly illustrated without undue exaggeration.

In Figure 15, I have illustrated a wheel construction substantially identical with that shown in Figures 10 to 14, inclusive, with the exception that the lugs 16 are struck outwardly from the shell 4 along a line definitely spaced from the gap 11 between the shell and tire rim 2. The band 36 may be attached to these lugs 16 in the same manner as hereinabove described, this figure being for the purpose of illustrating an application of the band for decorative purposes to any desired portion of the shell.

Figure 16:
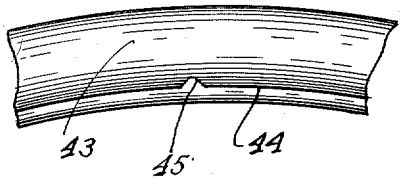
Figure 16 is an enlarged fragmentary rear elevational view of a still different form of band.
Figure 17:
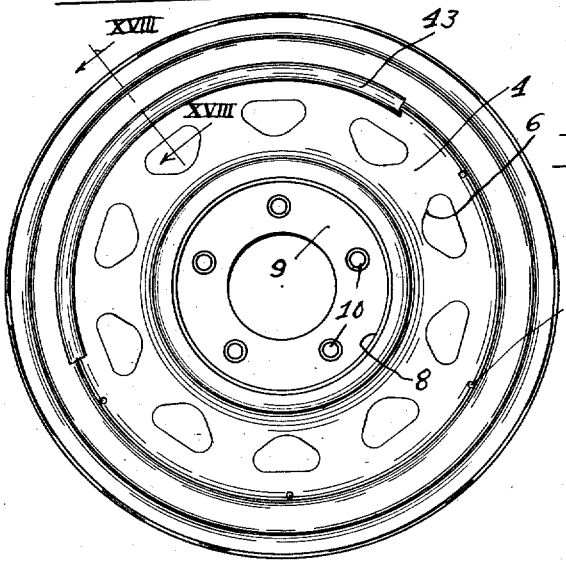
Figure 17 is a fragmentary side elevational view of a combination structure including a disk-wheel and a portion of a band of the character shown in Figure 16 attached thereon.
Figure 18:
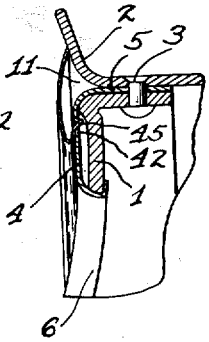
Figure 18 is an enlarged fragmentary vertical sectional view taken substantially as indicated by the line XVIII—XVIII of Figure 17.

In Figures 16 to 18, inclusive, I have illustrated a composite wheel and ornamental band construction of a somewhat modified form. The wheel construction is substantially the same as that above described, with the exception that the shell 4 is provided with spaced apertures 42 therein instead of the outstanding lugs 16 above described. In this instance, a decorative band 43 which may be of the type shown in Figures 1 to 5, inclusive, or of the type shown in Figures 10 to 15, inclusive, i. e., continuous or with abutting ends, or of the self-expansible spring leaf type, is held in position by the engagement of spaced teeth or lugs 45 in the apertures 42. As seen best in Figure 16, the band has an underturned portion 44 and spaced lugs 45 preferably formed integral with this portion project preferably at an angle thereto for suitable engagement within the apertures 42. It is obvious that any one of the bands described hereinabove may be mounted in this manner if so desired.

It is to be expressly understood that any particular form of decorative ring or band described herein may be substituted for any of the other forms, and utilized upon either of the wheel constructions.

From the foregoing, it will be apparent that I have provided not only a novel composite wheel and decorative band construction, but also novel means for holding a covering shell upon a wheel. It will be noted that the decorative structure, whether used to overlie the gap between the outer shell and the rim of the wheel or not, is exceedingly simple in construction, very readily applied in an expeditious and easy manner, secure in its engagement when once applied, and may be economically manufactured.

I claim as my invention:

1. In combination in a vehicle wheel, a front shell, an outwardly smooth surfaced tire rim on said shell, spaced lugs projecting from said shell adjacent the jointure between the shell and rim, and an ornamental band having underturned means disposed at an angle to the outer portion of the band and designed for engagement with said lugs, said band being compressible to vary the angle between the outer portion thereof and said underturned means to cause complete engagement between said underturned means and said lugs, and said band being shaped to extend outwardly adjacent the rim and conceal said jointure.

2. In combination a vehicle wheel, and an ornamental curved band shaped to cover the crack between the adjoining portions of said wheel, said band having underturned means thereon along one edge only thereof concealed by the outer portion of the band when the band is applied to the wheel leaving the opposite edge free to extend beyond said crack, and said wheel having means adjacent said crack engageable by said underturned means, said band being reformable as to its initial shape to enhance the engagement between both said means.

3. In combination, a member having a plurality of edge-like surfaces located at spaced intervals so as to substantially define the circumference of a circle, and an ornamental element in the form of a resilient self-expanding split ring having means for engaging behind said surfaces, said ring when so engaged having overlapped ends and being cut adjacent said ends in a manner to present an external appearance substantially that of an endless ring.

4. In combination, a member having a plurality of edge-like surfaces formed thereon, and a resilient self-expanding split ring having underturned means for engagement behind said surfaces, said surfaces being arranged sufficiently out of alignment with the circumference of a circle to cause said ring to assume the form of a circle even with the ends of the ring overlapped.

5. In combination, a vehicle wheel including a tire rim and inner supporting means comprising a wheel spider having openings therein akin to openings between spokes, an ornamental band for disposition over the side surface of the wheel adjacent the rim, and means engageable with said band and with said wheel spider in said openings to hold said band on the wheel.

6. An ornamental band for disposition adjacent the rim on the side surface of a vehicle wheel which has openings therein akin to the openings between spokes, said band being longitudinally arcuate in form and having an underturned portion concealed by the outer part of the band when the band is in position, and retaining means for effecting engagement with said underturned portion and with said wheel in certain of said openings to hold the band on the wheel.

7. An ornamental band for attachment to the side of a vehicle wheel in the form of a split ring with overlapped ends and carrying retaining means to hold the band on the wheel, an end portion of said band being cut out of alignment with the circumference of said ring in a manner to make said band present an external appearance substantially that of an endless ring when attached to the wheel.

8. In combination, an ornamental member for disposition on the side surface of a vehicle wheel which wheel includes spaced openings therein, said member being arcuate in form and having an underturned portion concealed by the outer part thereof when the member is in position, and retaining means for effecting a connection of said underturned portion with said wheel and certain of said openings to hold the member on the wheel.

9. In combination, a vehicle wheel including a tire rim, an inner supporting means comprising a wheel spider having openings therein, an ornamental member for disposition over the side surface of the wheel and extending radially inwardly of the rim, and means associated with said member and disposed in said wheel spider openings for cooperation with the edges of said openings to hold said member on the wheel.

10. In a wheel construction, a wheel including a tire rim part and a body part, said rim part having a base flange to which said body part is joined, said wheel having provided on its outer side spaced projections adjacent the junction of said parts, a circular ornamental member adapted to be applied over an outer surface of said wheel adjacent and over said joint and having a rearwardly extending springy edge flexible over and behind said projections to retain the member on the wheel.

11. The combination with a vehicle wheel of an ornamental member having a plurality of spaced projections thereon, said member comprising a hollow circular shell and being attached directly to a load bearing part of the wheel by engagement therewith with the load bearing part projecting into the interior of the shell, and a circular member demountably attached to said ornamental member by resilient snap-on engagement with certain of said projections, said circular member comprising a ring of curved cross section with its radially inner marginal edge provided with retaining means for cooperation with the other member.

12. The combination with a vericle wheel of an ornamental member having a plurality of spaced projections thereon, said member being attached directly to a load bearing part of the wheel by engagement therewith, and a circular member demountably attached to said ornamental member by resilient snap-on engagement with certain of said projections, said circular member having an underturned edge portion in retaining cooperation with said projections, and said projections extending radially inwardly toward said underturned edge portion.

13. The combination with a vehicle wheel of an annular retaining member having laterally projecting retaining means, said member being attached directly to a load bearing part of the wheel by engagement therewith, and a circular member detachably attached to said annular member by a snap-on engagement with said projecting means, said circular member having an underturned edge portion in retained cooperation with said projecting means, said circular member comprising a ring of curved cross section with its radially inner marginal edge provided with means for retaining cooperation with the other member.

14. In a wheel construction, a wheel including a tire rim part and a body part, said rim part having a base flange to which said body part is joined, said wheel having provided on its outer side spaced projections adjacent the junction of said parts, a circular ornamental member adapted to be applied over an outer surface of said tire rim part and comprising a continuous ring of curved cross section and having a rearwardly extending springy inner edge flexible over and behind said projections to retain the ring on the wheel.

GEORGE ALBERT LYON.